(12) United States Patent
Albrecht

(10) Patent No.: US 7,602,789 B2
(45) Date of Patent: Oct. 13, 2009

(54) LOW OVERHEAD METHOD TO DETECT NEW CONNECTION RATE FOR NETWORK TRAFFIC

(75) Inventor: Alan R. Albrecht, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

(21) Appl. No.: 11/585,034

(22) Filed: Oct. 23, 2006

(65) Prior Publication Data
US 2008/0095065 A1    Apr. 24, 2008

(51) Int. Cl.
H04L 12/28 (2006.01)

(52) U.S. Cl. .................. 370/395.32; 711/216

(58) Field of Classification Search .......... 370/252, 370/351, 389, 395.1, 395.32; 711/216
See application file for complete search history.

(56) References Cited

U.S. PATENT DOCUMENTS 6,389,468 B1    5/2002   Muller et al.
6,873,600 B1    3/2005   Duffield et al.
2003/0135625 A1*  7/2003  Fontes et al. ............... 709/228

* cited by examiner

Primary Examiner—Huy D. Vu
Assistant Examiner—Shaishav Shah

(57) ABSTRACT

A system and method for detecting new connection rates for network traffic that employs a set of tables and a hash function. Information identifying a connection is hashed to a hash value using the hash function. Each hash value identifies a location in a first table and a second table. The hash values for the connections detected during a predetermined time period are stored in the first table. The hash values for the connections detected during the predetermined time period preceding the current time period are stored in the second table. As the hash values are stored in the first table, they are compared to the hash values stored in the second table to identify new connections. The new connections are accumulated. The second table is then cleared, and the hash values for the detected connections in the next time period are stored in the second table.

20 Claims, 1 Drawing Sheet

LOW OVERHEAD METHOD TO DETECT NEW CONNECTION RATE FOR NETWORK TRAFFIC

BACKGROUND

Known anti-virus technologies used in computer networks typically rely on software to detect a pattern that is abnormal to system network traffic. An alternative to this type of virus protection for network traffic is to use a virus throttling process that looks at the behavior of the traffic to identify virus activity. For example, virus throttling may look at network connections to see if a computer in the network is attempting to quickly connect to many computers at the same time. These types of virus diagnostics identify the rate of new connections per second that a network device is generating to detect abnormal behavior to detect a virus, as well as provide information to other management applications that may also care about changes in the connection rate.

To implement this type of virus detection, software is used to maintain a list or table of currently active network connections. An algorithm compares each data packet being transmitted on the network to the table entries to detect new connections. Maintaining the table is fairly expensive because each entry includes a source IP address, a destination IP address, a layer 3 protocol, a layer 4 source port and layer 4 destination port information for the data packet that requires significant hardware and software resources. Each time a data packet is received by a network device, some type of search is performed to determine if an entry in the table matches the data packet that was just received. If the algorithm is unable to find a match in the table, then a new connection has occurred and a table entry would be set up for the new connection, assuming there is room in the table. In the background of the algorithm, another task would be running to remove old or closed connections.

DETAILED DESCRIPTION OF THE EMBODIMENTS

Figure 1:
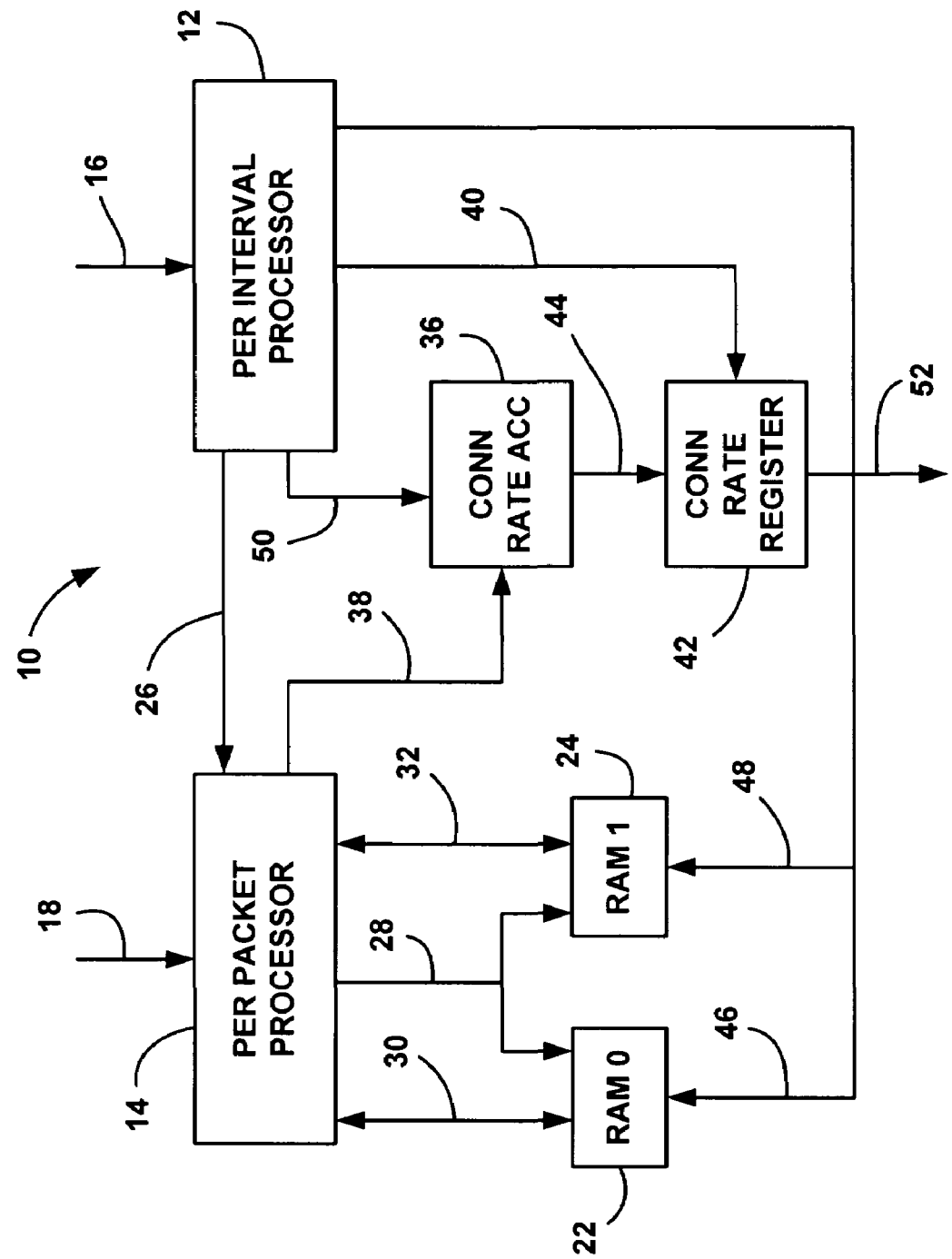
FIG. 1 is a block diagram showing an operation for determining a new connection rate for network traffic.

The above-described solution is appropriate when a detailed list of all of the active connections is needed. Because each new connection in the network is required to go through the process to determine if it is a new connection, and if so, add it to the table, network performance issues may arise as a result of such an involved process. However, if it is only necessary to look for dramatic changes in new connections per second, such as for virus detection, other less costly solutions may be appropriate.

The following discussion discloses a technique for determining new connection rates in network traffic that does not require a significant amount of hardware and software as was necessary in the known connection rate determination techniques. The technique employs a hash function to reduce the five-way group including the source IP address, the destination IP address, the layer 3 protocol, the layer 4 source port and the layer 4 destination port information typically used to determine new connection rates to a smaller index value. Particularly, the hash function takes a larger number, such as the five-way group mentioned above, and processes it through an algorithm to reduce it to a smaller number. For example, the five-way group referred to above may include ninety-six bits of information. The algorithm that performs the hash function may reduce that ninety-six bit value to a twenty bit value. Any hash function that is suitable for the purposes described herein can be used, many of which are known to those skilled in the art. A hash value is derived from the five-way group so that following data packets of the same connection will hash to the same value. It is imprecise in that packets from other connections have a random chance of also hashing to the same value. The chance that two connections hash to the same value can be controlled by the selection of the width in bits of the index value that the hash function reduces the five values to.

As will be discussed in detail below, each hash value is assigned a bit in a particular table, where each bit represents a connection in the network traffic. For every predetermined time period, a new table is populated with the hash values representing the current connections. The new table is compared to an old table storing the hash values for the connections for the previous time period to determine the change in the connection rate.

Assume that the hash function generates a number between 0 and 1000. Two or more tables in RAM are generated that include one bit for every hash value. Starting with two 1K tables, the tables are assigned to a particular device that the user wishes to measure the traffic. Logical choices could be to assign a set of tables to a port of the switch that traffic is received on, or associated with a received MAC source address or IP source address. In this example, a received port is used, and a sample time period of one second is used as non-limiting examples.

During the first second of the operation, as network traffic at the port is received, it is hashed and for each data packet the bit in the first table addressed by the hashed value of the five-way group is set. During the next time window, all received network traffic for the port is hashed, and is used to set the bits in the second hash table addressed by the hash value of the five-way group. If a bit is set in the second table and it has not been previously set in the first table, then the algorithm determines that a new connection has been detected and a count is incremented or the rate is measured. At the end of the second time window, if the number of new connections is greater than a predetermined number, an alert is sent to the software management system. Also, at the end of the second sample period, the first table is cleared, and the algorithm returns to setting bits in the first table for the connections in the next sampling period. A comparison is made to see if network connections were set during the previous time window in the second table. Using this process of flipping back and forth between the tables, it can be determined whether the network traffic for the current time window was seen in the previous time window.

FIG. 1 is a block diagram of a system 10 that stores a hash value in two tables to detect connection rates in network traffic, as discussed above. The system 10 includes a per interval processor 12 and a per packet processor 14. The per interval processor 12 receives a detection rate interval signal on line 16 that defines the time window during which a particular table is being filled, for example one second. The per packet processor 14 receives a network packet signal on line 18 that identifies each current connection in the network as they are received by a particular device in the network, such as a port of a network switch. The system 10 also includes a first RAM 22 and a second RAM 24 that provide the two tables discussed above. The per packet processor 14 receives a signal on line 26 from the per interval processor 12 that identified which RAM 22 or 24 is currently the primary RAM, i.e., which table is currently being populated with the connections for the current time window.

For each network packet signal received on the line 18, the per packet processor 14 identifies the connection related fields, for example, the five-way group discussed above. The processor 14 hashes the five-way group to the hash value using the predetermined hash function, which identifies an address location in the RAMs 22 and 24. The address location in the RAMs 22 and 24 identifies which bit in the RAM 22 or 24 will be set for that hash value depending on which RAM 22 or 24 is the primary RAM, and is provided on line 28. A read/write (R/W) line 30 is provided between the RAM 22 and the processor 14 and an R/W line 32 is provided between the RAM 24 and the processor 14. The processor 14 will set the bit for the address location of the hashed network packet on the line 30 or 32 depending on which RAM 22 or 24 is currently the primary RAM, and will read whether that bit at that address location in the other RAM 22 or 24 was set during the previous time window on the other line 30 or 32. For each hash value that identifies a new connection, the processor 14 will increment a connection rate accumulator 36 on line 38. The processor 14 will not increment the accumulator 36 if the address location for a current data packet has already been set in the primary RAM 22 or 24.

At the end of the current time window, the processor 12 will send a load signal on line 40 to a connection rate register 42 that loads the accumulated new connections value from the accumulator 36 on line 44. Further, the processor 12 clears the RAM 22 or 24 that was not the primary RAM for that time window on line 46 or 48, respectively, so that it is ready to be the primary RAM for the next time window. Also, the processor 12 clears the accumulator 36 on line 50. The processor 12 also changes the primary RAM on the line 26. The connection rate is output from the register 42 on line 52.

A possible disadvantage of this technique is that a connection may be operating at a low utilization level, and not have a packet pass through during the previous sample period, and so falsely be detected as a new connection. One possibility to overcome this disadvantage is to increase the sample period, but this could reduce the speed at which a high connection rate is detected. Lengthening the sample period could also distort the measurement by increasing the chance that the multiple connections set the same location, causing the new connections to not be detected.

To address low utilization connections, the algorithm can be extended to three or more tables. In the case of more than two tables, a new connection is detected if the bits for the hash values are not seen in any of the previous sample periods stored in the tables. This improves the ability to detect traffic for low utilization connections, without lengthening the sample.

Another possible disadvantage is that multiple connections can and will hash to the same location. Traffic from one connection may set the bit in one sample period, and then traffic from another connection may set the same bit in the next sample period, and thus, a new connection is not detected. The first response to this is to increase the size of the table. The larger the table, the less likely two unrelated connections will hash to the same location. Also, the present invention is not intended to be an exact measure of the connection rate, but more of a flag for dramatic changes in connection rates, so some imprecision is tolerable.

There are several variables that could change depending on the product application. These variables include the number of tables, the size of the tables, the source index, i.e., port, MAC address, IP address, etc. The logic in the tables could be fragmented and duplicated depending on the different sources or one large RAM could be implemented and programmable logic could be used to create several different tables within that RAM.

The method described above can be easily implemented in a set of hardware state machines. Hashing the five-way group, setting the bit in the RAM, checking whether the bit is set in the previous tables and clearing the RAMs are all acceptable operations for hardware to implement. Also, if there is no need to maintain a large table of connections, the RAM requirements are significantly reduced and the table can be stored on chip.

The foregoing discussion discloses and describes merely exemplary embodiments. One skilled in the art will readily recognize from such discussion, and from the accompanying drawings and claims, that various changes, modifications or variations can be made therein without departing from the spirit and scope of the embodiments as defined in the following claims.

What is claimed is:

1. A method for determining a connection rate of network traffic, said method comprising:
   detecting network connections, by using a data packet processor, by identifying predetermined information;
   using a hash function to hash the information for each network connection to a hash value, where each hash value identifies a location in a first table and a second table;
   storing the hash values in the first table during a time window defined by a predetermined period of time;
   storing the hash values in the second table during a next time window following the preceding time window, wherein the next time window is defined by the predetermined period of time; and
   comparing the hash values stored in the second table to the hash values stored in the first table to determine whether there are new network connections.

2. The method according to claim 1 further comprising clearing the first table after the hash values stored in the tables are compared, storing the hash values in the first table during the next time window defined by the predetermined period of time after the previous time window, and comparing the hash values stored in the first table to the hash values stored in the second table to determine whether there are new network connections.

3. The method according to claim 1 wherein comparing the hash values includes determining whether a currently hashed network connection being stored as a hash value in the second table is stored as a hash value in the first table.

4. The method according to claim 1 further comprising accumulating the new network connections during the next time window to determine the connection rate at the end of the next time window.

5. The method according to claim 1 wherein the predetermined information includes a source IP address, a destination IP address, a layer 3 protocol, a layer 4 source port and a layer 4 destination port of a connection.

6. The method according to claim 1 wherein the predetermined period of time is one second.

7. The method according to claim 1 further comprising storing the hash values in a third table during another next time window following the preceding time window, wherein the another next time window is defined by the predetermined period of time, wherein comparing the hash values includes comparing the hash values stored in the third table to the hash values stored in the first and second tables to determine whether there are new network connections.

8. A system for determining a connection rate of network traffic, said system comprising:
- a data packet processor responsive to network packets identifying network connections by predetermined information, said data packet processor hashing the network packets to hash values;
- a first storage device for storing the hash values during a time window defined by a predetermined period of time; and
- a second storage device for storing the hash values during a next time window defined by the predetermined period of time, said data packet processor comparing the hash values stored in the second storage device to the hash values stored in the first storage device to determine whether there are new network connections.

9. The system according to claim 8 further comprising an interval processor, said interval processor clearing the first storage device after the hash values stored in the storage devices are compared, said data packet processor storing the hash values in the first storage device during the next time window defined by the predetermined period of time after the previous time window, and comparing the hash values stored in the first storage device to the hash values stored in the second storage device to determine whether there are new network connections.

10. The system according to claim 8 wherein the data packet processor determines whether a currently hashed network connection being stored as a hash value in the second storage device is stored as a hash value in the first storage device.

11. The system according to claim 8 further comprising an accumulator for accumulating the new network connections during the next time window to determine the connection rate at the end of the next time window.

12. The system according to claim 8 wherein the predetermined information includes a source IP address, a destination IP address, a layer 3 protocol, a layer 4 source port and a layer 4 destination port of a connection.

13. The system according to claim 8 wherein the predetermined period of time is one second.

14. The system according to claim 8 further comprising a third storage device for storing the hash values during another next time window following the preceding time window, wherein the another next time window is defined by the predetermined period of time, and wherein the data packet processor compares the hash values stored in the third storage device to the hash values stored in the first and second storage devices to determine whether there are new network connections.

15. The system according to claim 8 further comprising a network switch including a port, wherein the system determines the connection rate at the port.

16. A system for determining a connection rate of a network, said system comprising:
- a data packet processor responsive to network packets identifying network connections by predetermined information, said date packet processor hashing the network packets to hash values;
- a first storage device for storing the hash values during a time window defined by a predetermined period of time;
- a second storage device for storing the hash values during a next time window defined by the predetermined period of time, said data packet processor comparing the hash values stored in the second storage device to the hash values stored in the first storage device to determine whether there are new network connections, said data packet processor determining whether a currently hashed network connection being stored as a hash value in the second storage device is stored as a hash value in the first storage device;
- an interval processor, said interval processor clearing the first storage device after the hash values stored in the storage devices are compared, said data packet processor storing the hash values in the first storage device during the next time window defined by the predetermined period of time after the previous time window, and comparing the hash values stored in the first storage device to the hash values stored in the second storage device to determine whether there are new network connections; and
- an accumulator for accumulating the new network connections during the next time window to determine the connection rate at the end of the next time window.

17. The system according to claim 16 wherein the predetermined information includes a source IP address, a destination IP address, a layer 3 protocol, a layer 4 source port and a layer 4 destination port of a connection.

18. The system according to claim 16 wherein the predetermined period of time is one second.

19. The system according to claim 16 further comprising a third storage device for storing the hash values during another next time window following the preceding time window, wherein the another next time window is defined by a predetermined period of time, and wherein the data packet processor compares the hash values stored in the third storage device to the hash values stored in the first and second storage devices to determine whether there are new network connections.

20. The system according to claim 16 further comprising a network switch including a port, wherein the system determines the connection rate at the port.

* * * * *

UNITED STATES PATENT AND TRADEMARK OFFICE
CERTIFICATE OF CORRECTION

| | | |
|---|---|---|
| PATENT NO. | : 7,602,789 B2 | Page 1 of 1 |
| APPLICATION NO. | : 11/585034 | |
| DATED | : October 13, 2009 | |
| INVENTOR(S) | : Alan R. Albrecht | |

It is certified that error appears in the above-identified patent and that said Letters Patent is hereby corrected as shown below:

In column 6, line 5, in Claim 16, delete "date" and insert -- data --, therefor.

Signed and Sealed this

Sixth Day of July, 2010

David J. Kappos
*Director of the United States Patent and Trademark Office*